Sept. 23, 1941.  O. N. BRYANT  2,256,970
GOVERNING MECHANISM
Filed Dec. 8, 1939
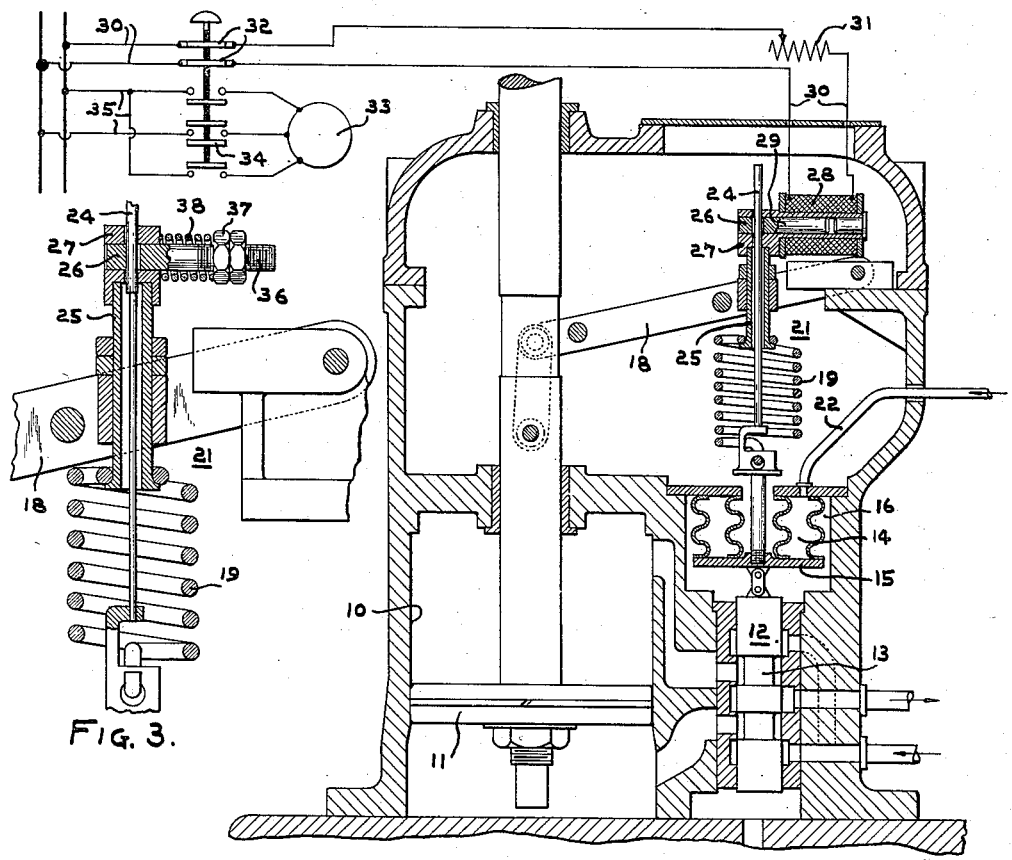
FIG. 3.
FIG. 1.
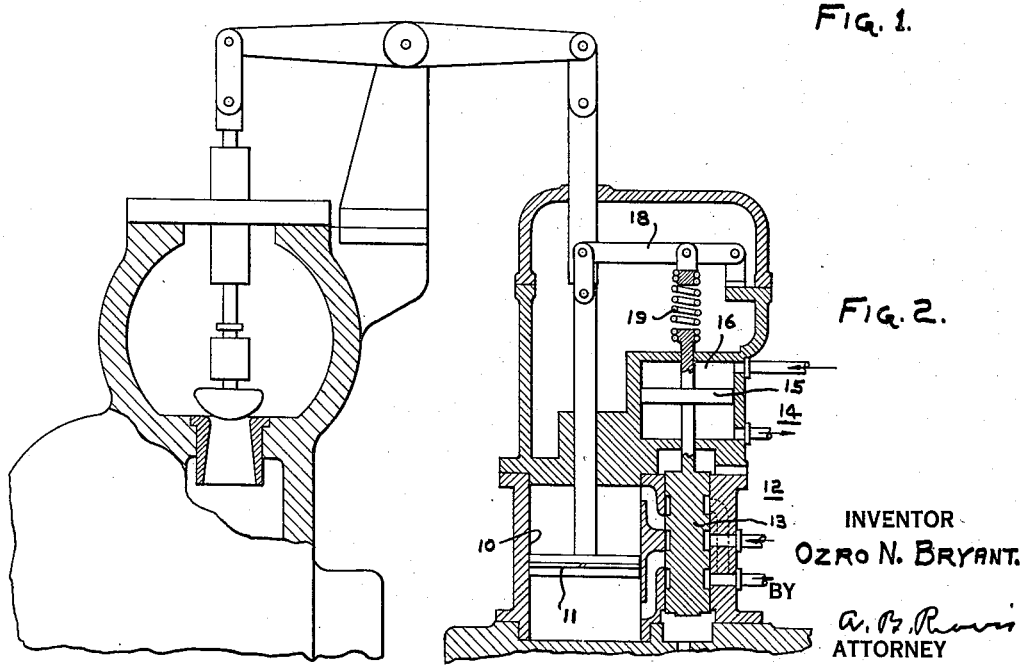
FIG. 2.
INVENTOR
Ozro N. Bryant.
BY
ATTORNEY Patented Sept. 23, 1941

2,256,970

UNITED STATES PATENT OFFICE 2,256,970

GOVERNING MECHANISM

Ozro N. Bryant, Prospect Park, Pa., assignor to Westinghouse Electric & Manufacturing Company, East Pittsburgh, Pa., a corporation of Pennsylvania Application December 8, 1939, Serial No. 308,245

4 Claims. (Cl. 121—41)

My invention relates to a pressure-responsive servo-motor having a spring link connecting the follow-up lever to the relay and it has for an object to provide means to avoid cyclic movement of parts on account of relay frictional resistance.

Servo-motors are usually employed with governors; and, with governing apparatus of the hydraulic type, the servo-motor has a pressure-responsive relay and follow-up mechanism to restore the latter to normal or neutral position, the follow-up mechanism conveniently employing a spring link between a follow-up lever and the relay, the arrangement being such that, with a change in controlling pressure and consequent movement of the relay, the operating piston is moved, and movement of the follow-up lever by the latter changes the force of the spring link, movement continuing until the change in force of the spring link balances the change in force due to the controlling pressure, at which time the relay is restored to neutral position. Frictional resistance of the relay upsets the ideal action of the servo-motor with the result that the operating piston overtravels by an amount sufficient to make the spring overcome the frictional resistance as well as the change of pressure supplied to the pressure-responsive device. Furthermore, as soon as motion of the relay begins, the frictional resistance thereof suddenly decreases with the result that it travels beyond the neutral position, causing the operating piston to reverse its direction and travel until the spring load overcomes the relay frictional resistance. The relay again overtravels and the cycle is repeated indefinitely, the resulting motion of the operating piston being proportional to the relay frictional resistance. While it is possible to design a mechanism which has no measurable relay frictional resistance, the resulting apparatus would be expensive and delicate and it would not be very desirable for a turbine governor because it would respond to the slightest change in control pressure.

In accordance with my invention, I overcome overtravel of the operating piston and of the relay for the reasons indicated by the use of means in connection with the follow-up link spring so that the purely elastic nature thereof may be overcome when desirable, such means preferably comprising a link including parts capable of relative longitudinal movement and arranged in parallel with the spring link together with an energy-absorbing device for setting up resistance to relative movement of the parts. If the resistance is equal to or greater than the frictional resistance of the relay, it will be apparent that the linkage between the follow-up lever and the relay is in effect a solid link within the limitation of the resistance existing between the parts. Consequently, the relay will be less responsive to slight fluctuations in controlling pressure if the resistance of the parts is made at least as great as that of the relay, and it will be apparent that the cyclic motion of the operating piston and of the relay will not occur. While the resistance effect rendering the parts effective as a solid link is desirable so long as the prime mover operates in parallel with other units, it is not desirable when the prime mover is being synchronized, nor when operating alone. Accordingly, the means for setting up resistance between the parts is made so as to be controllable from zero to any desired maximum by any suitable remotely operated means. Preferably, the resistance-controlling means is interconnected with the governor speed changer so that the resistance means may be rendered ineffective whenever the speed changer motor is energized. A further object of my invention is to provide apparatus having the foregoing improved features of construction and of operation.

These and other objects are effected by my invention as will be apparent from the following description and claims taken in connection with the accompanying drawing forming a part of this application, in which:

Fig. 1 is a view of a servo-motor and a control system used in operating my improved motor apparatus;

Fig. 2 is a diagrammatic view of a prior arrangement; and,

Fig. 3 is a sectional detail view showing a modified form of brake device.

Referring first to Fig. 2 in order that my improved servo-motor apparatus may be better understood, there is shown a servo-motor including an operating cylinder 10 with an operating piston 11 therein. Motive fluid is admitted and exhausted to and from the cylinder 10 by means of the relay, at 12, including the valve 13 and pressure-responsive device, at 14.

The pressure-responsive device includes a movable abutment or piston element 15 operatively connected to the pilot valve and forming a part of the enclosure for the pressure chamber 16 supplied with oil under controlling or governing pressure.

The operating piston 11 is connected to a follow-up lever 18 and the latter is connected by means of a spring link 19 to the relay, at 12. With this type of apparatus, due to relay friction and to the elastic character of the follow-up mechanism, overtravel of the operating piston and of the relay continuously occurs in a cyclic manner; and it is the purpose of this invention to provide means for avoiding overtravel.

Referring to Fig. 1, the arrangement is the same as that already described with apparatus added to avoid overtravel. The additional apparatus includes means, at 21, arranged in parallel with the spring link 19 between the follow-up lever 18 and the relay, at 12, and adapted to function, at times, as a rigid link between these parts. The pressure-responsive device, at 14, for the relay, at 12, is supplied with fluid under controlling or governing pressure by the conduit 22, as is well-known in the art.

The link means, at 21, comprises a plurality of parts capable of relative longitudinal movement and it is shown, for example, as including a rod 24 connected to the abutment 15 and a sleeve 25 telescoping thereon and having a threaded connection with the lever 18. The spring link 19 preferably has its ends connected to the rod and to the sleeve. To provide for absorption of energy to provide resistance opposing relative movement of the parts 24 and 25 so that they may function, at times, as a solid link, one of such parts, for example, the sleeve part 25 is shown as carrying a brake element 26 cooperating with the rod 24.

Preferably, the brake element 26 is carried by a guide 27, connected to the sleeve 25 and supporting the solenoid 28 with which cooperates the iron core 29 forming a part of the brake element.

The winding of the solenoid is connected to an energizing circuit 30 including a rheostat 31 and a cut-out switch 32.

Assuming that the cut-out switch 32 is closed, then the rheostat 31 may be suitably adjusted to obtain the desired amount of friction resisting relative movement between the rod and the sleeve 25.

While the cut-out switch may be opened and closed manually, I prefer to interconnect it with the governor speed changer motor 33 so that as long as the latter is in operation, the switch is open. Accordingly, as shown in Fig. 1, the switch 32 is connected to the switch 34 for the speed changer motor circuit 35 so that when the latter is closed the switch 32 is open.

The apparatus shown in Fig. 3 is the same as that already described except that, instead of using a solenoid to exert force on the brake shoe 26, a spring is used for this purpose. Accordingly, the shoe has a threaded shank 36 for nuts 37 bearing against the spring 38 to compress the latter to a desired extent with respect to the guide structure 27 in order to provide the requisite braking force for the shoe 26.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In a servo-motor, an operating cylinder with an operating piston therein, a pressure-responsive relay controlling the admission and exhaust of motive fluid to and from the operating cylinder, follow-up mechanism rendered effective by movement of the operating piston to return the relay to neutral position, said follow-up mechanism including elastic and inelastic links arranged in parallel between a pair of spaced parts thereof and the inelastic link including telescopic parts, a frictional brake between the telescopic parts, and means for varying the frictional force of the brake.

2. In a servo-motor, an operating cylinder with an operating piston therein, a pressure-responsive relay controlling the admission and exhaust of motive fluid to and from the operating cylinder, follow-up mechanism rendered effective by movement of the operating piston to return the relay to neutral position, said follow-up mechanism including elastic and inelastic links arranged in parallel between a pair of spaced parts thereof and the inelastic link including telescopic parts, a frictional brake between the telescopic parts and including magnetic means to render it effective to develop frictional resistance opposing relative movement of the parts, an electrical circuit for the magnetic means, and a rheostat in said circuit.

3. In a servo-motor, an operating cylinder with an operating piston therein, a pressure-responsive relay for controlling the admission and exhaust of motive fluid to and from the operating cylinder, a follow-up lever connected to the operating piston, a spring link between said lever and the relay, a rod connected to the relay, a sleeve carried by the lever and telescopically arranged with respect to the rod, and means for resisting relative movement of the sleeve and of the rod.

4. In a servo-motor, an operating cylinder with an operating piston therein, a pressure-responsive relay for controlling the admission and exhaust of motive fluid to and from the operating cylinder, a follow-up lever connected to the operating piston, a spring link between said lever and the relay, a rod connected to the relay, a sleeve carried by the lever and encompassing the rod, a brake shoe carried by the sleeve, and means for causing the brake shoe to engage the rod under such pressure as to provide for frictional resistance opposing relative movement of the sleeve and of the rod equal at least to the relay frictional resistance.

OZRO N. BRYANT.